US011092404B2

(12) United States Patent
Bryan et al.

(10) Patent No.: US 11,092,404 B2
(45) Date of Patent: Aug. 17, 2021

(54) RECOIL PAD FOR A FIREARM

(71) Applicant: Weatherby, Inc., Sheridan, WY (US)

(72) Inventors: Benjamin H. Bryan, Sheridan, WY (US); Basil J. Staros, Sheridan, WY (US)

(73) Assignee: WEATHERBY, INC., Sheridan, WY (US)

( * ) Notice: Subject to any disclaimer, the term of this patent is extended or adjusted under 35 U.S.C. 154(b) by 0 days.

(21) Appl. No.: 16/846,499

(22) Filed: Apr. 13, 2020

(65) Prior Publication Data

US 2020/0340778 A1 Oct. 29, 2020

Related U.S. Application Data

(60) Provisional application No. 62/838,975, filed on Apr. 26, 2019.

(51) Int. Cl.
*F41C 23/08* (2006.01)
*F41C 23/20* (2006.01)

(52) U.S. Cl.
CPC .............. *F41C 23/08* (2013.01); *F41C 23/20* (2013.01)

(58) Field of Classification Search
CPC .................................. F41C 23/08; F41C 23/20
USPC ............................................................. 42/74
See application file for complete search history.

(56) References Cited

U.S. PATENT DOCUMENTS

| | | | | |
|---|---|---|---|---|
| 2,468,349 A | * | 4/1949 | Stewart | F41C 23/08 42/74 |
| 3,363,352 A | * | 1/1968 | Pachmayr | F41C 23/08 42/74 |
| 8,087,101 B2 | * | 1/2012 | Ferguson | A42B 3/124 2/455 |
| 10,228,213 B1 | * | 3/2019 | Smith | F41C 23/06 |
| 2019/0082785 A1 | | 3/2019 | Spanks | |

* cited by examiner

*Primary Examiner* — Reginald S Tillman, Jr.
(74) *Attorney, Agent, or Firm* — Bennet K. Langlotz; Langlotz Patent & Trademark Works, LLC

(57) ABSTRACT

A recoil pad for a firearm has a compressible body, the body having a forward surface configured to face toward the firearm, an opposed rear surface configured to face toward the shoulder of a user, and the body comprising an anisotropic matrix of flexible material extending from the forward surface to the rear surface. The body may be a unitary mass. The body may be an agglomeration of welded particles. The body may have a plurality of planar members interconnected by elongated spans. The body may define a medial plane associated with a medial plane of the firearm. The planar members may be oriented perpendicularly to the medial plane of the body. The body may define a first array of elongated holes passing through the body in a first direction, and a second array of elongated holes passing through the body in a second direction perpendicular to the first direction.

22 Claims, 19 Drawing Sheets

RECOIL PAD FOR A FIREARM

CROSS-REFERENCE TO RELATED APPLICATION

This application claims the benefit of U.S. Provisional Patent Application No. 62/838,975 filed on Apr. 26, 2019, entitled "Lattice Lightweight Recoil Pad→RP-one," which is hereby incorporated by reference in its entirety for all that is taught and disclosed therein.

FIELD OF THE INVENTION

The present invention relates to firearms, and more particularly to a recoil pad having a reduced weight without compromising recoil stability for large energy dissipation.

BACKGROUND OF THE INVENTION

Recoil pads increase a shooter's enjoyment of the shooting experience by absorbing and dissipating the shock of the blast of an attached firearm. Although many prior recoil pads have been developed, they can add significant weight to the buttstock of the attached firearm. Traditional recoil pads also do not control directional dissipation of recoil forces, which can cause the shooter to have greater difficulty with controlling the firearm after discharge and making accurate shots.

Therefore, a need exists for a new and improved recoil pad for a firearm having a reduced weight without compromising recoil stability for large energy dissipation. In this regard, the various embodiments of the present invention substantially fulfill at least some of these needs. In this respect, the recoil pad for a firearm according to the present invention substantially departs from the conventional concepts and designs of the prior art, and in doing so provides an apparatus primarily developed for the purpose of having a reduced weight without compromising recoil stability for large energy dissipation.

SUMMARY OF THE INVENTION

The present invention provides an improved recoil pad for a firearm, and overcomes the above-mentioned disadvantages and drawbacks of the prior art. As such, the general purpose of the present invention, which will be described subsequently in greater detail, is to provide an improved recoil pad for a firearm that has all the advantages of the prior art mentioned above.

To attain this, the preferred embodiment of the present invention essentially comprises a compressible body, the body having a forward surface configured to face toward the firearm, an opposed rear surface configured to face toward the shoulder of a user, and the body comprising an anisotropic matrix of flexible material extending from the forward surface to the rear surface. The body may be a unitary mass. The body may be an agglomeration of welded particles. The body may have a plurality of planar members interconnected by elongated spans. The body may define a medial plane associated with a medial plane of the firearm. The planar members may be oriented perpendicularly to the medial plane of the body. The body may define a first array of elongated holes passing through the body in a first direction, and a second array of elongated holes passing through the body in a second direction perpendicular to the first direction. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

Figure 1:
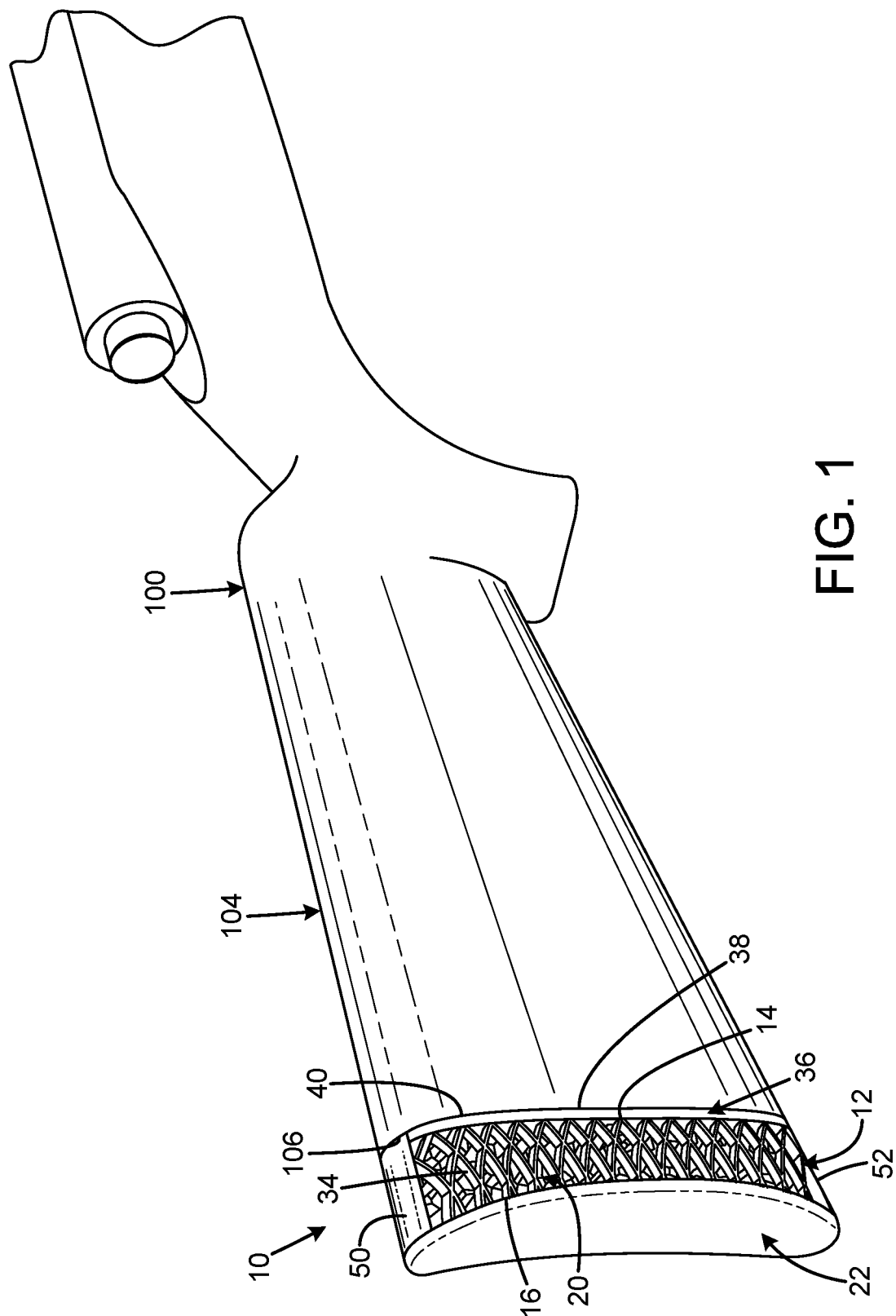
FIG. 1 is a rear isometric view of the current embodiment of the recoil pad for a firearm constructed in accordance with the principles of the present invention attached to a firearm stock.
Figure 2:
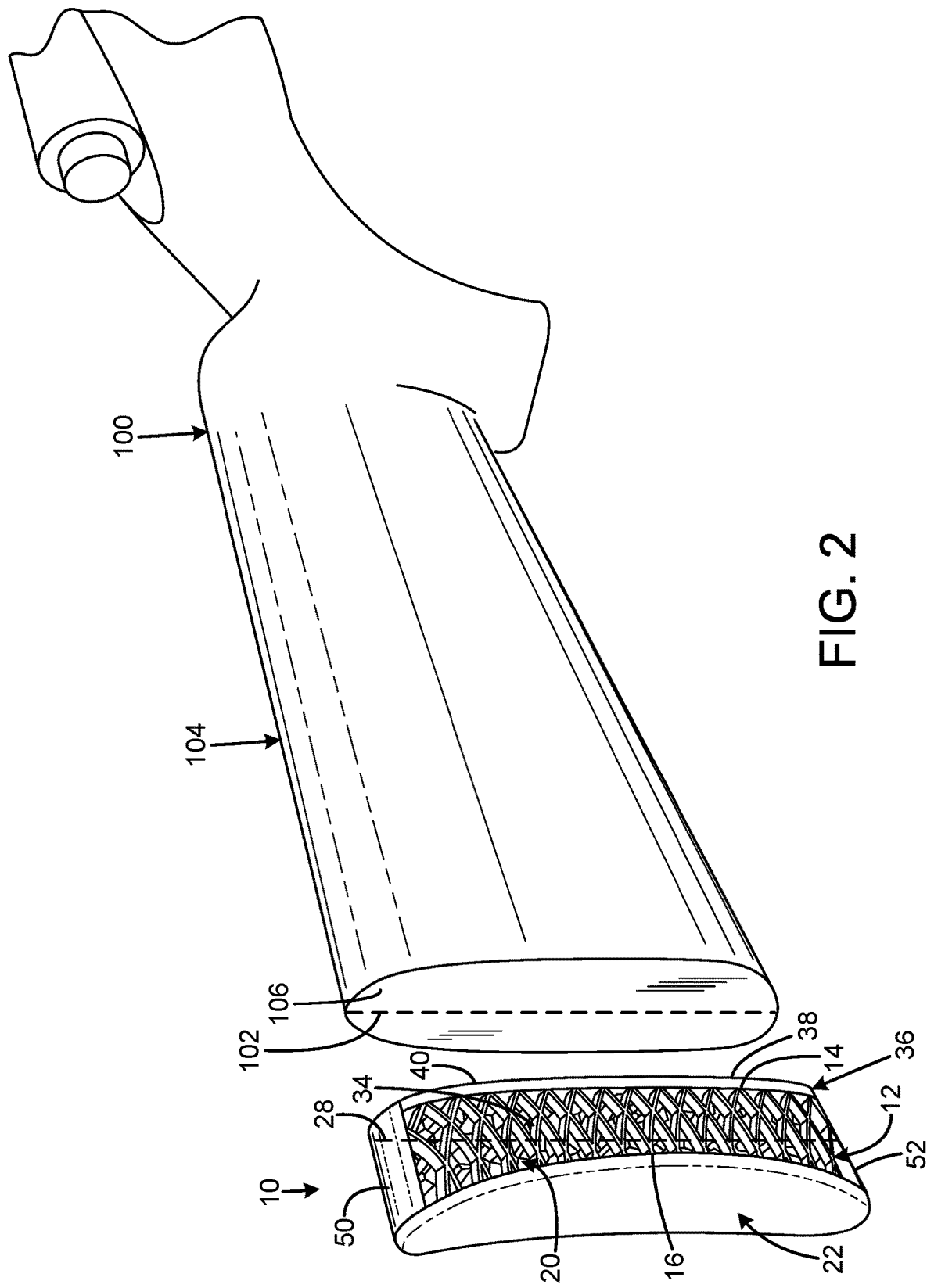
FIG. 2 is a rear isometric view of the recoil pad for a firearm of FIG. 1 detached from the firearm stock.
Figure 3:
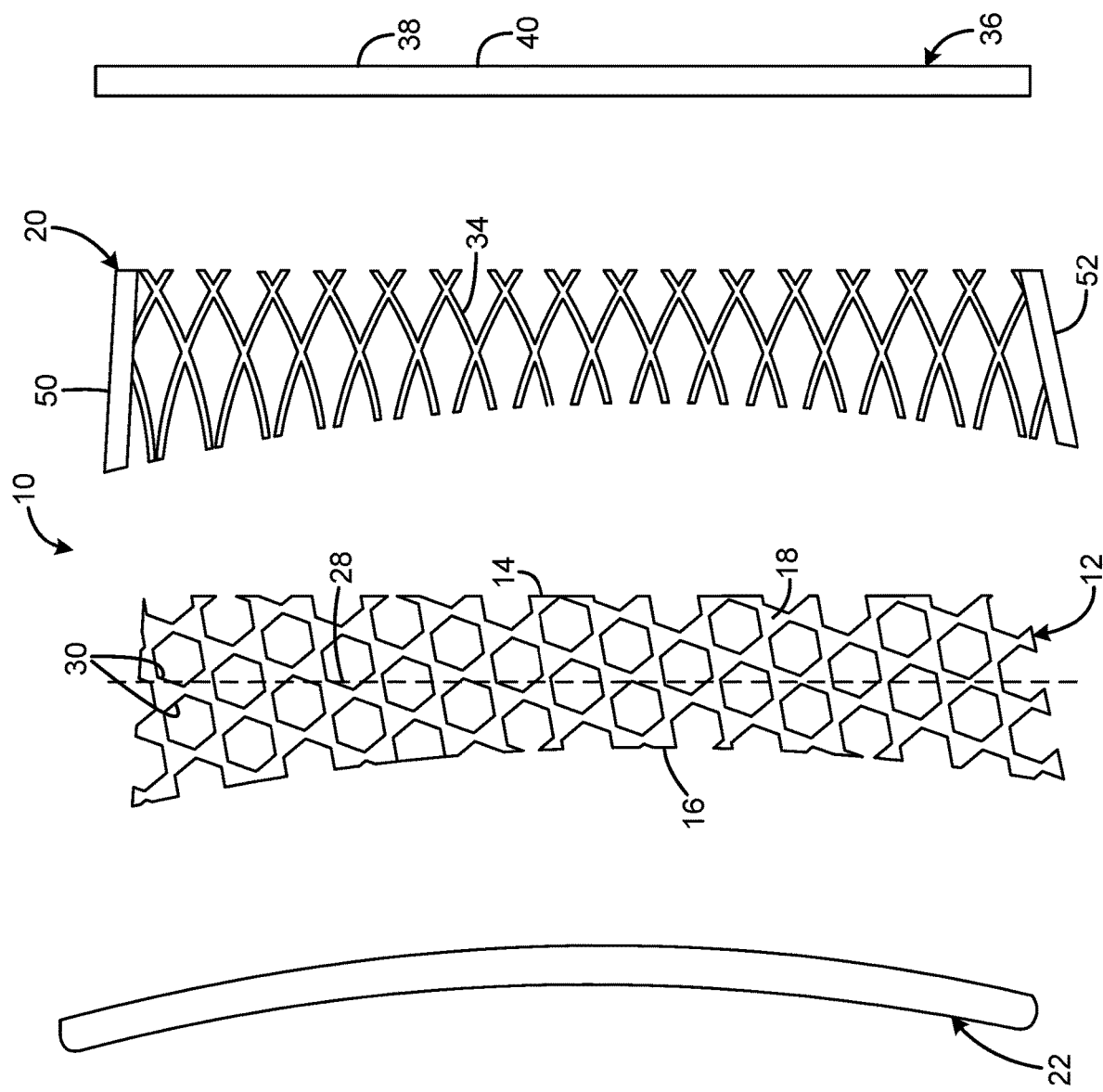
FIG. 3 is an exploded side view of the recoil pad for a firearm of FIG. 1.
Figure 4:
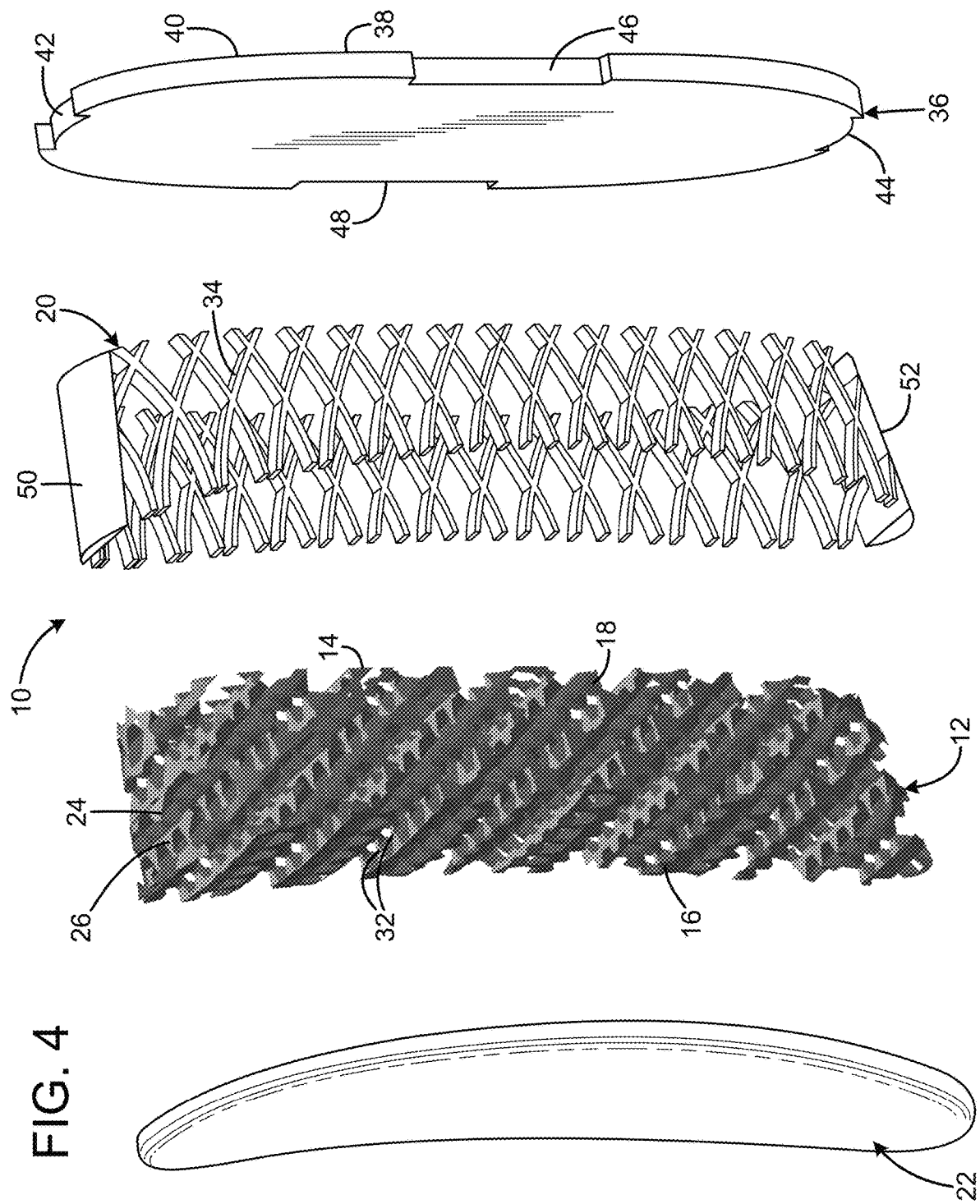
FIG. 4 is an exploded isometric view of the recoil pad for a firearm of FIG. 1.
Figure 5:
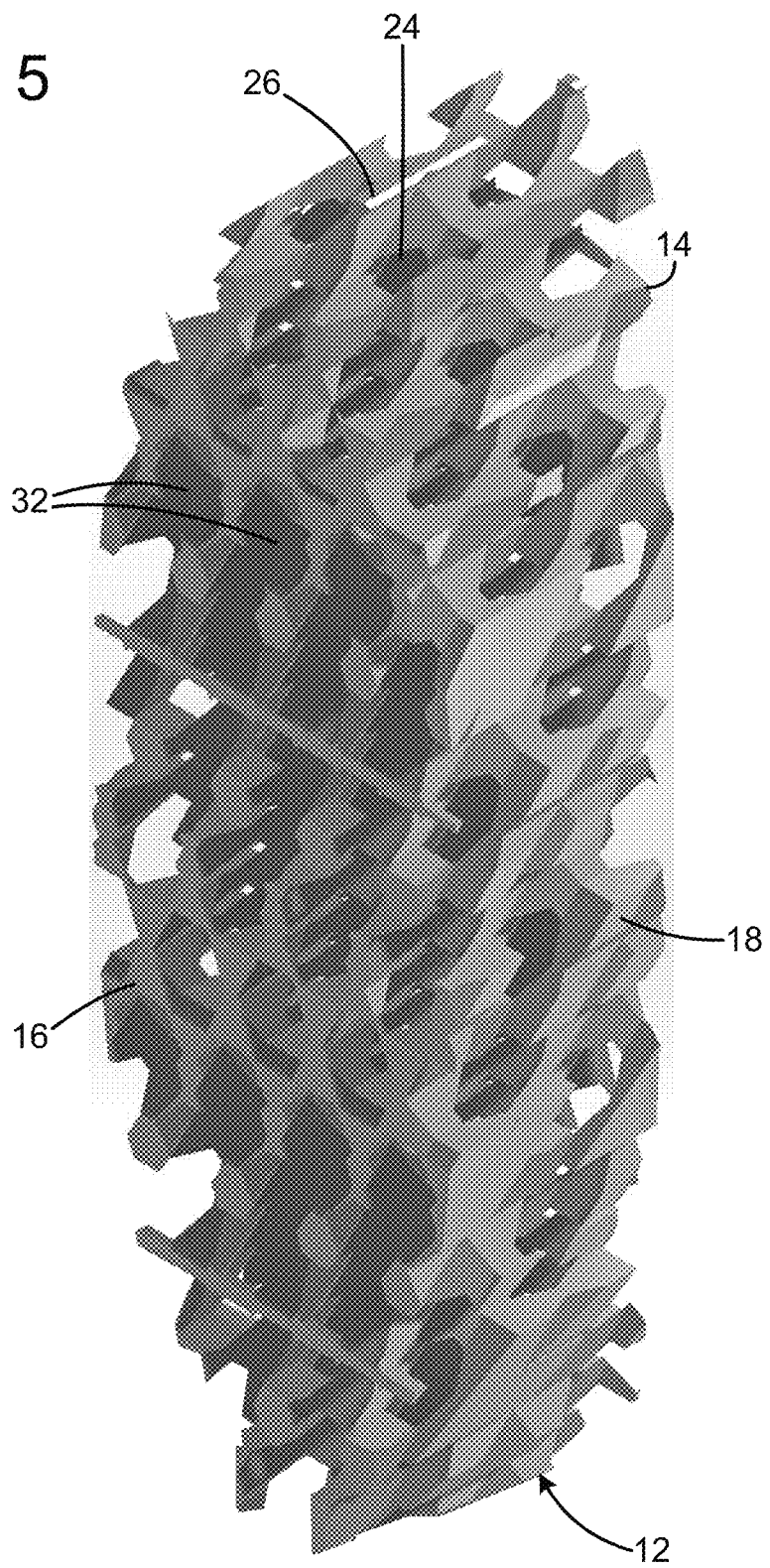
FIG. 5 is a rear isometric view of the core of the recoil pad for a firearm of FIG. 1.
Figure 6:
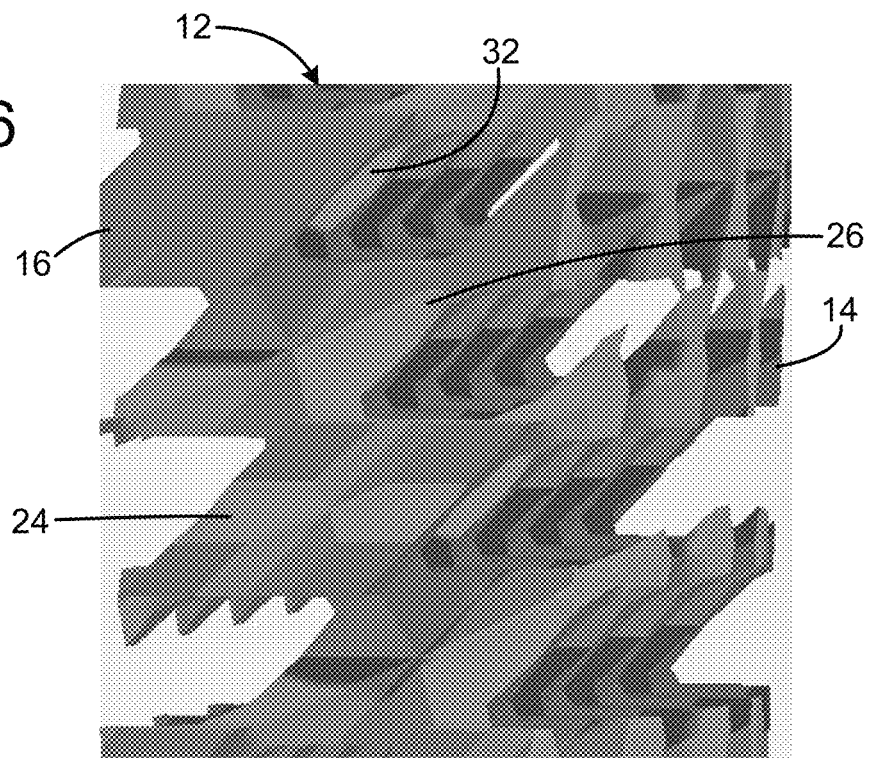
FIG. 6 is an enlarged isometric view of the body/core of the recoil pad for a firearm of FIG. 5.
Figure 7:
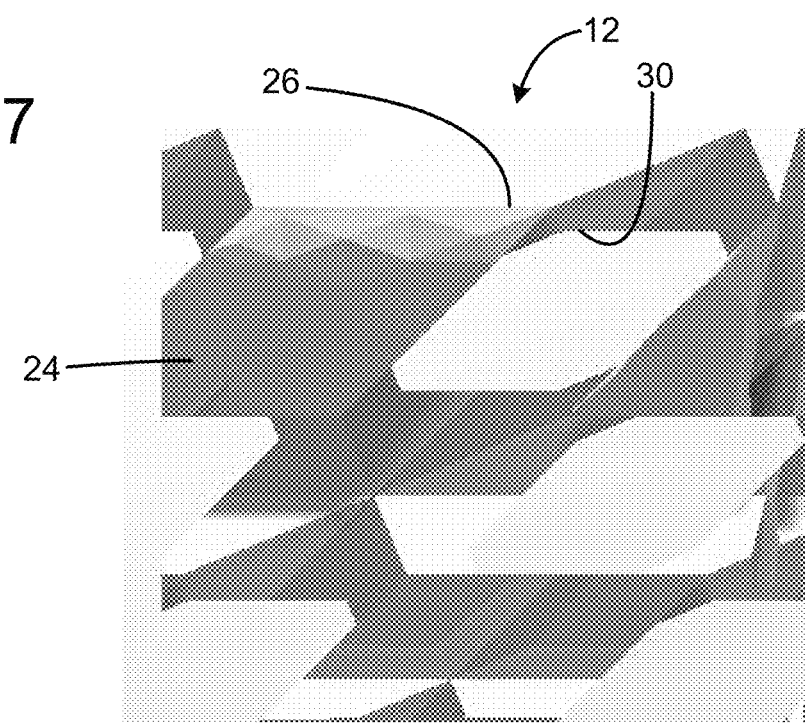
FIG. 7 is an enlarged side view of the body/core of the recoil pad for a firearm of FIG. 5.
Figure 8:
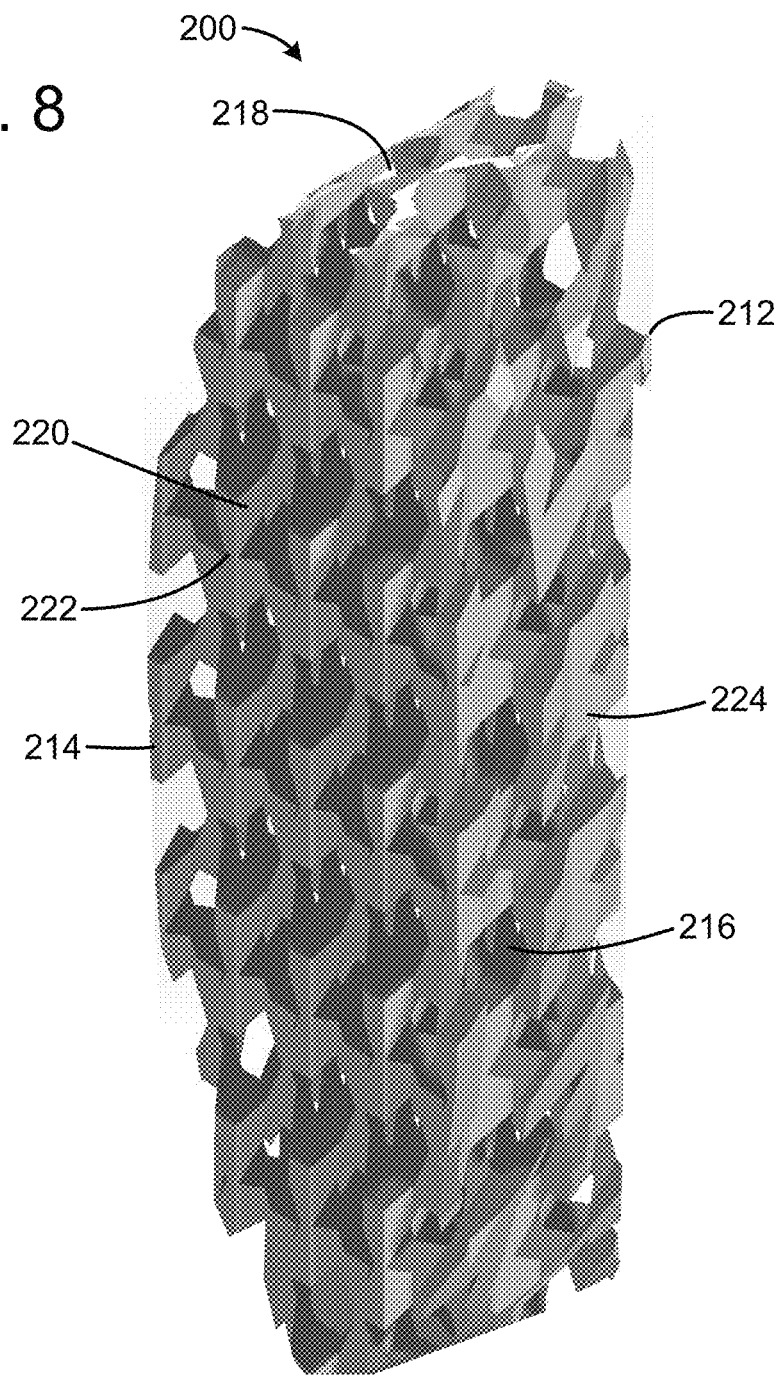
FIG. 8 is a rear isometric view of a first alternative embodiment of the body/core of the recoil pad for a firearm of FIG. 1.
Figure 9:
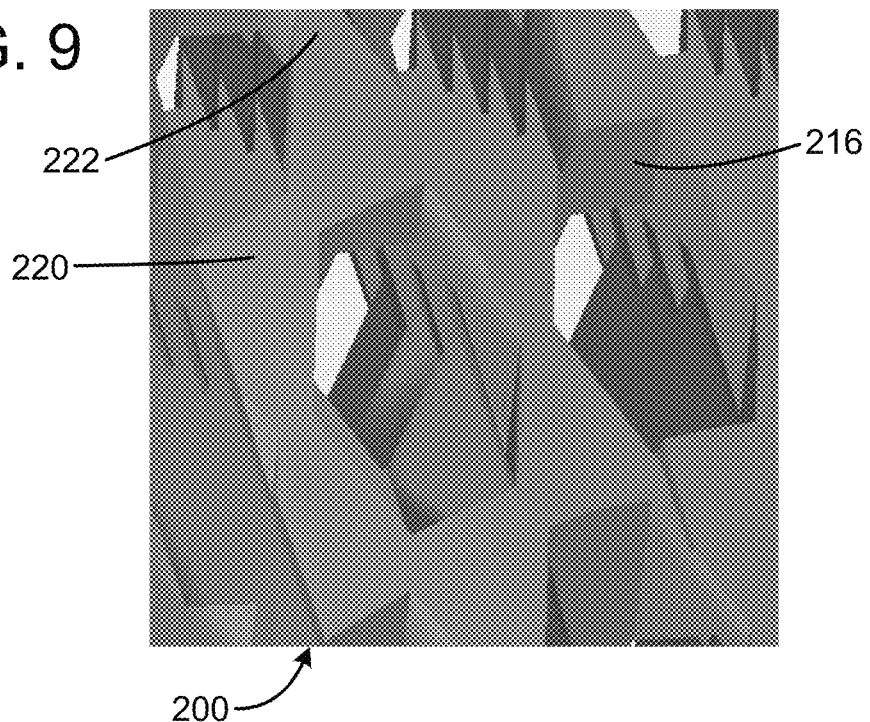
FIG. 9 is an enlarged isometric view of a first alternative embodiment of the body/core of the recoil pad for a firearm of FIG. 8.
Figure 10:
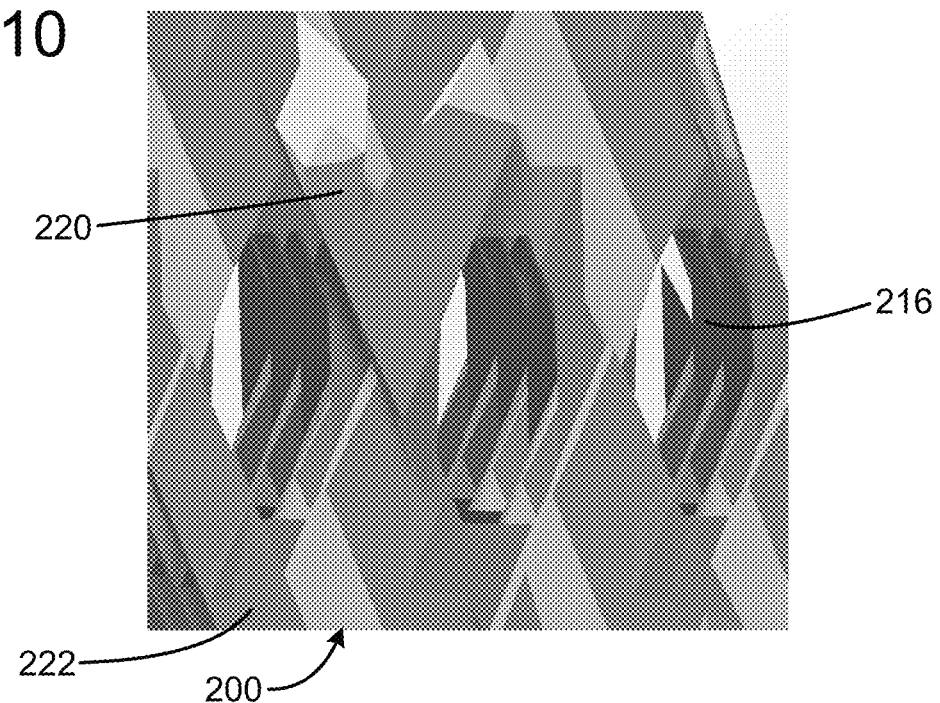
FIG. 10 is an enlarged isometric view of a first alternative embodiment of the body/core of the recoil pad for a firearm of FIG. 8.
Figure 11:
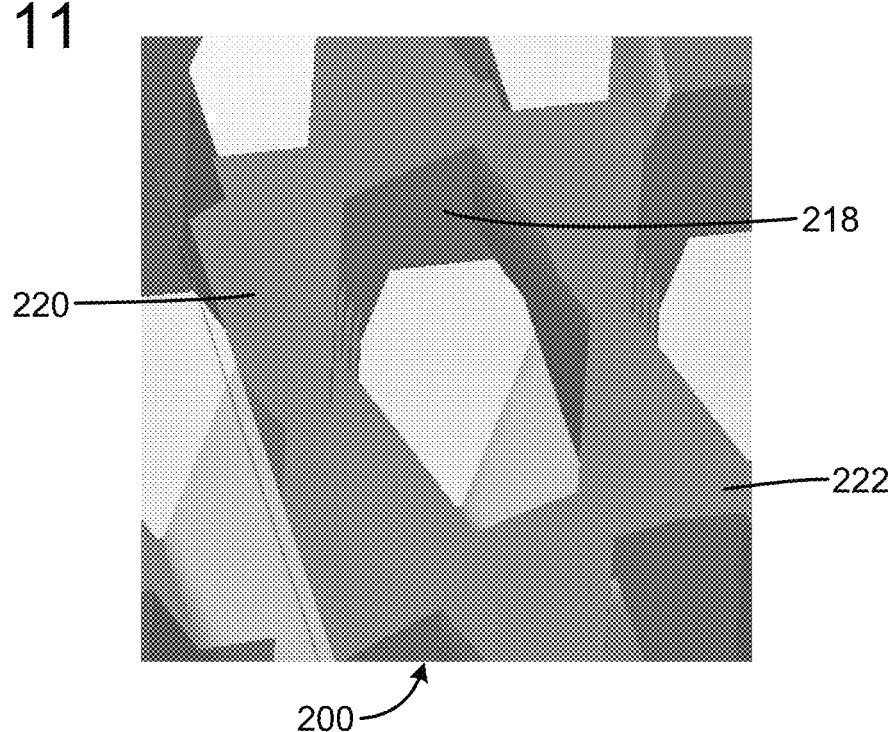
FIG. 11 is an enlarged top view of a first alternative embodiment of the body/core of the recoil pad for a firearm of FIG. 8.
Figure 12:
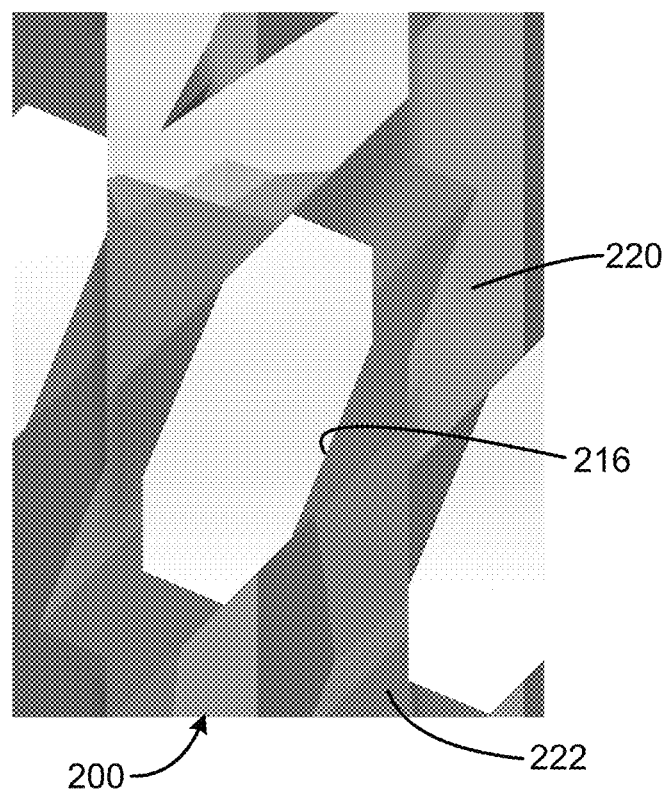
FIG. 12 is an enlarged side view of a first alternative embodiment of the body/core of the recoil pad for a firearm of FIG. 8.
Figure 13:
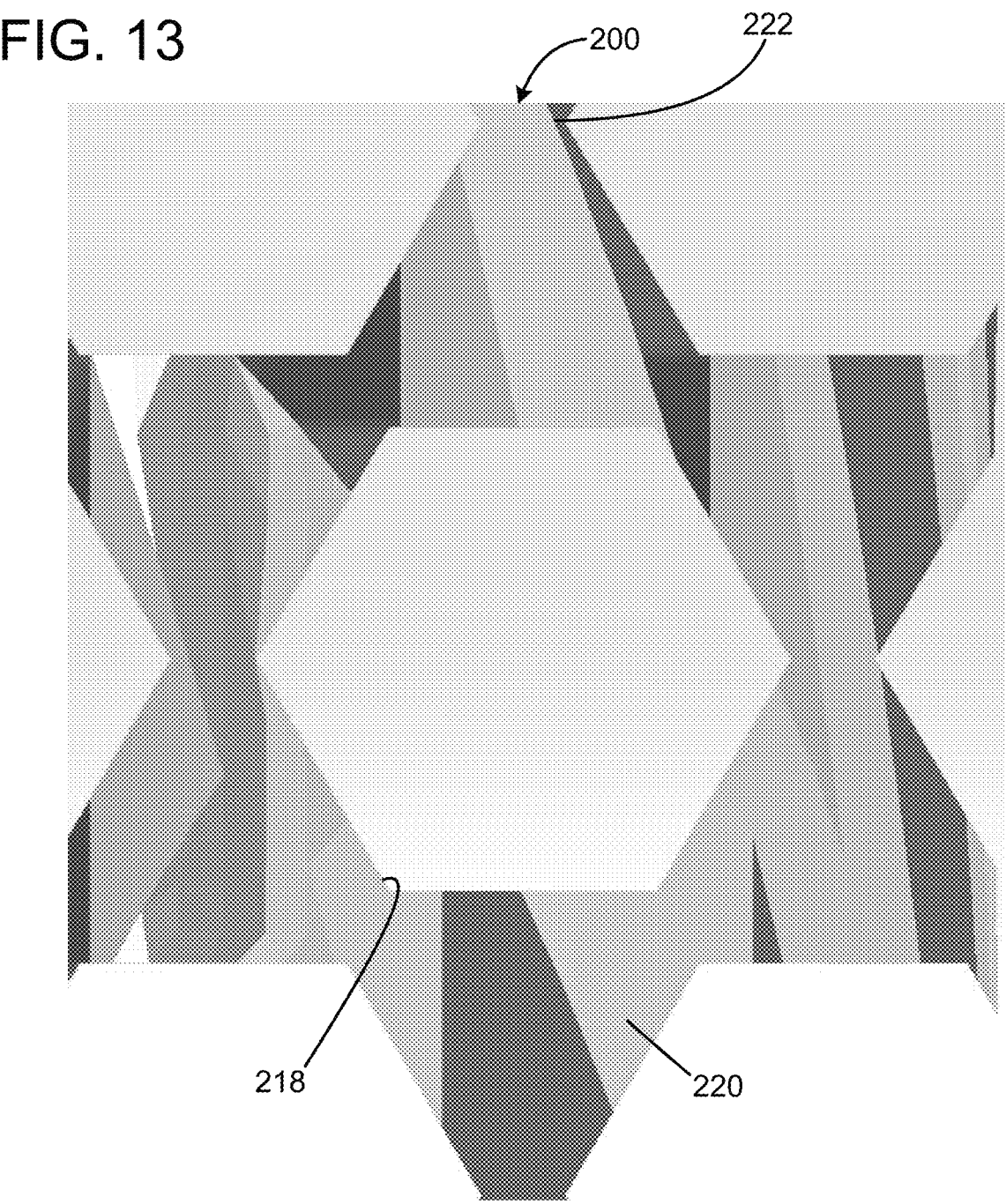
FIG. 13 is an enlarged top view of a first alternative embodiment of the body/core of the recoil pad for a firearm of FIG. 8.
Figure 14:
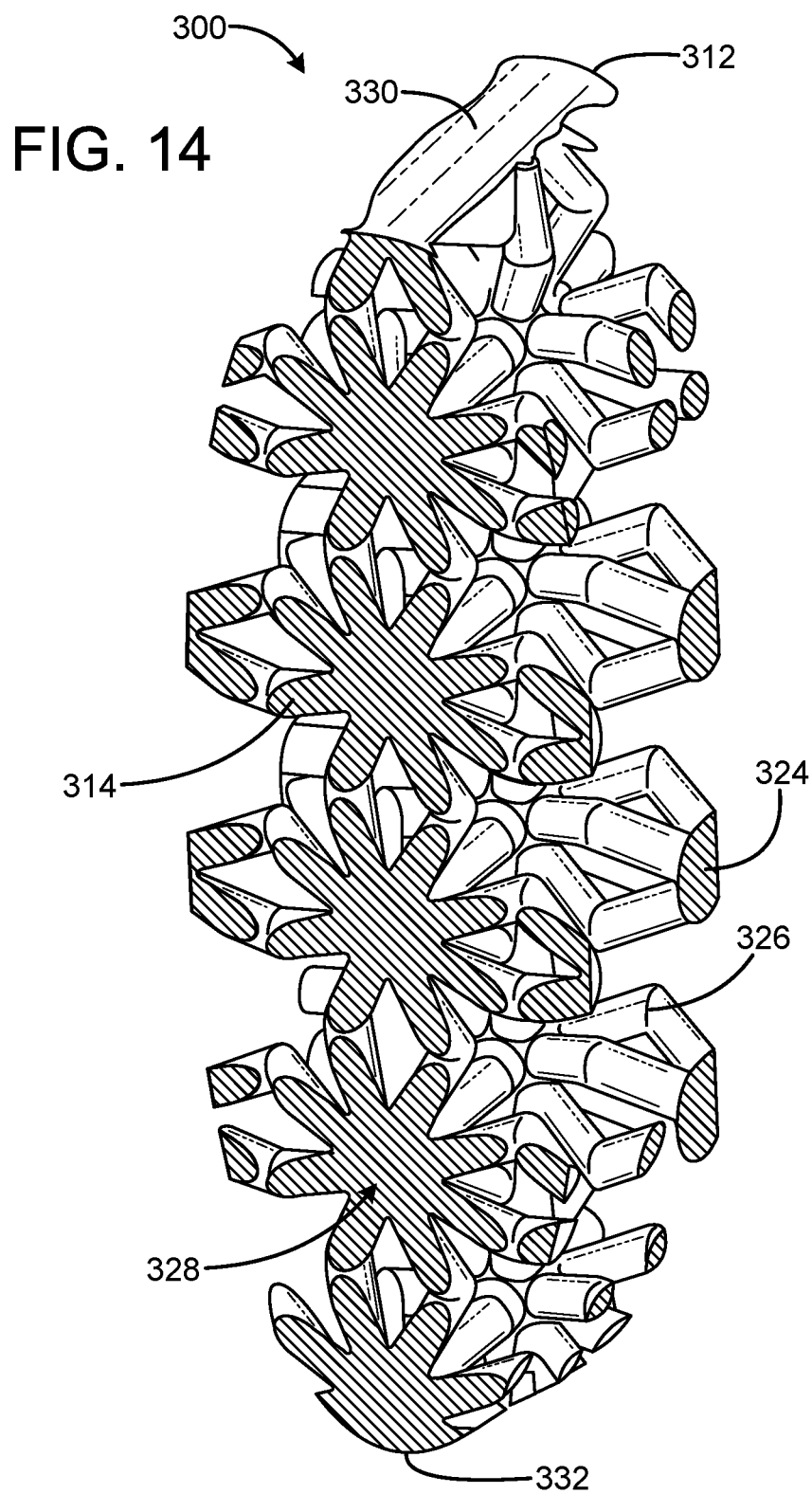
FIG. 14 is a rear isometric view of a second alternative embodiment of the body/core of the recoil pad for a firearm of FIG. 1.
Figure 15:
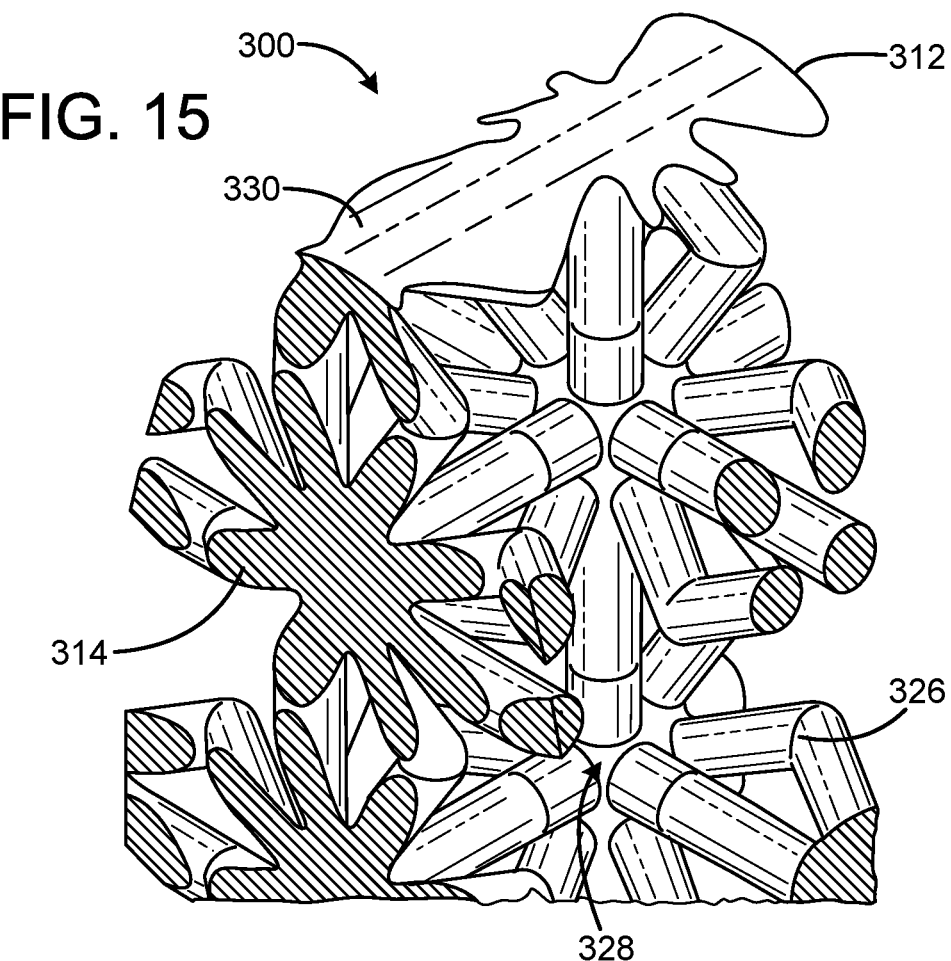
FIG. 15 is an enlarged rear isometric view of the second alternative embodiment of the body/core of the recoil pad for a firearm of FIG. 14.
Figure 16:
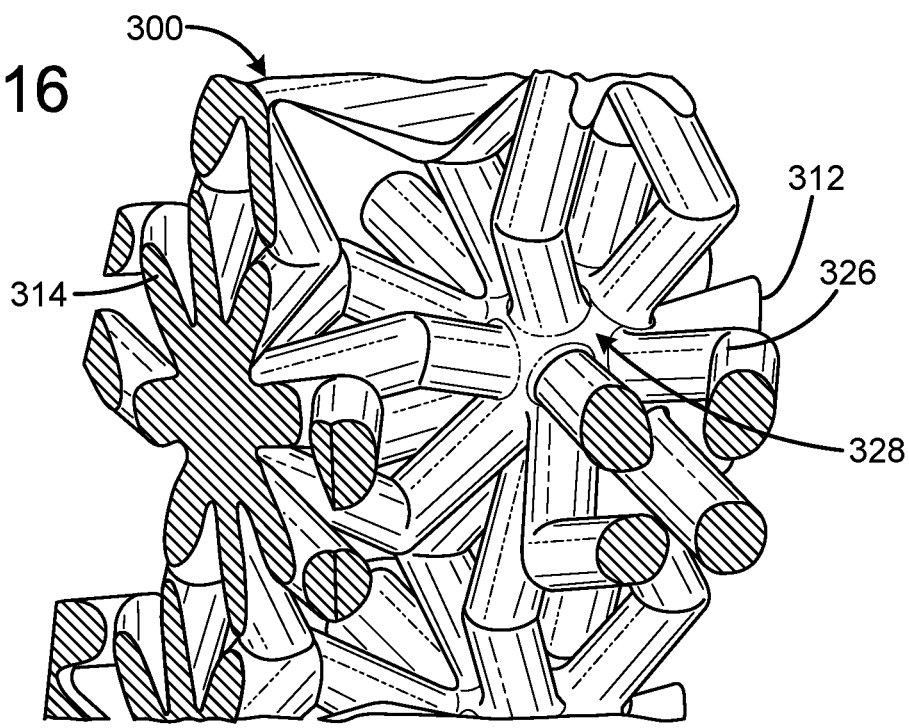
FIG. 16 is an enlarged rear isometric view of the second alternative embodiment of the body/core of the recoil pad for a firearm of FIG. 14.
Figure 17:
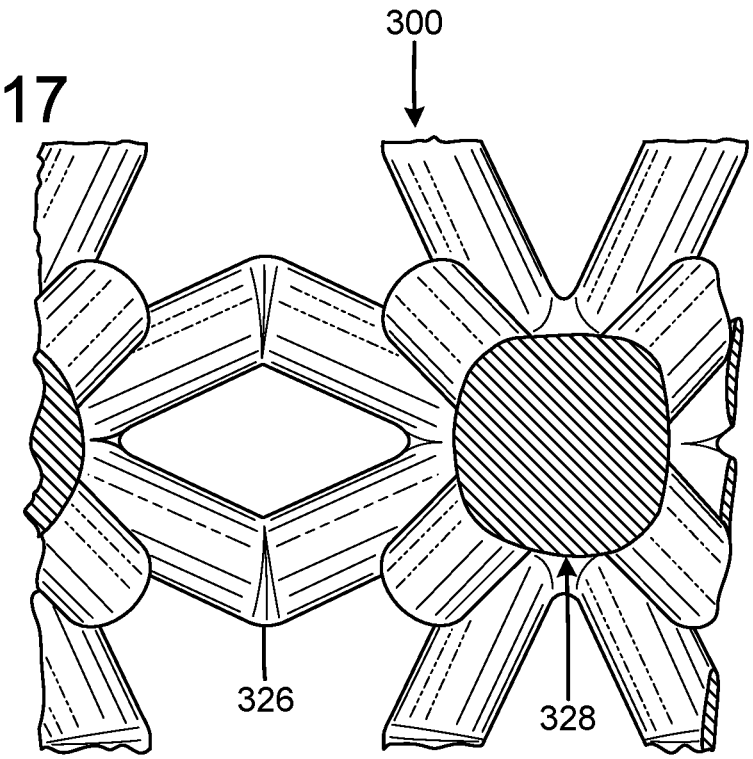
FIG. 17 is an enlarged side view of the second alternative embodiment of the body/core of the recoil pad for a firearm of FIG. 14.
Figure 18:
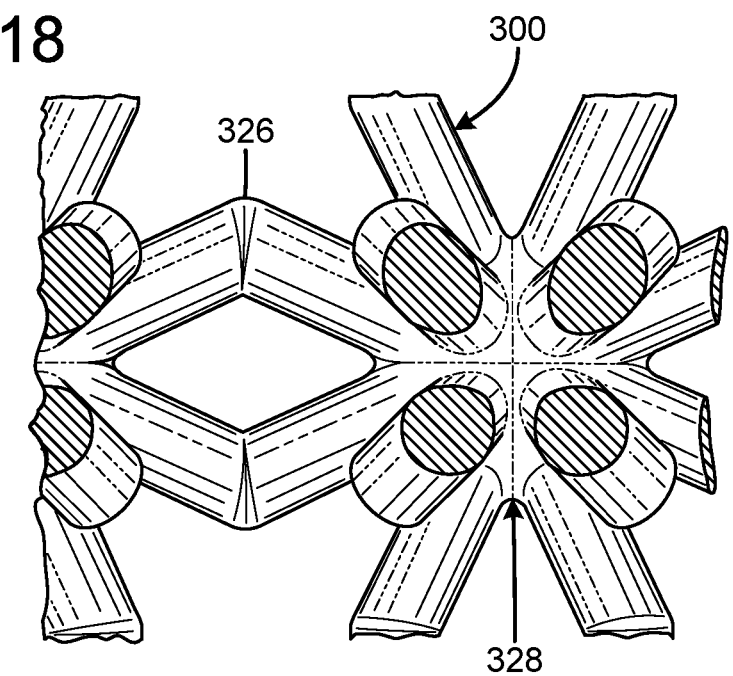
FIG. 18 is an enlarged side view of the second alternative embodiment of the body/core of the recoil pad for a firearm of FIG. 14.
Figure 19:
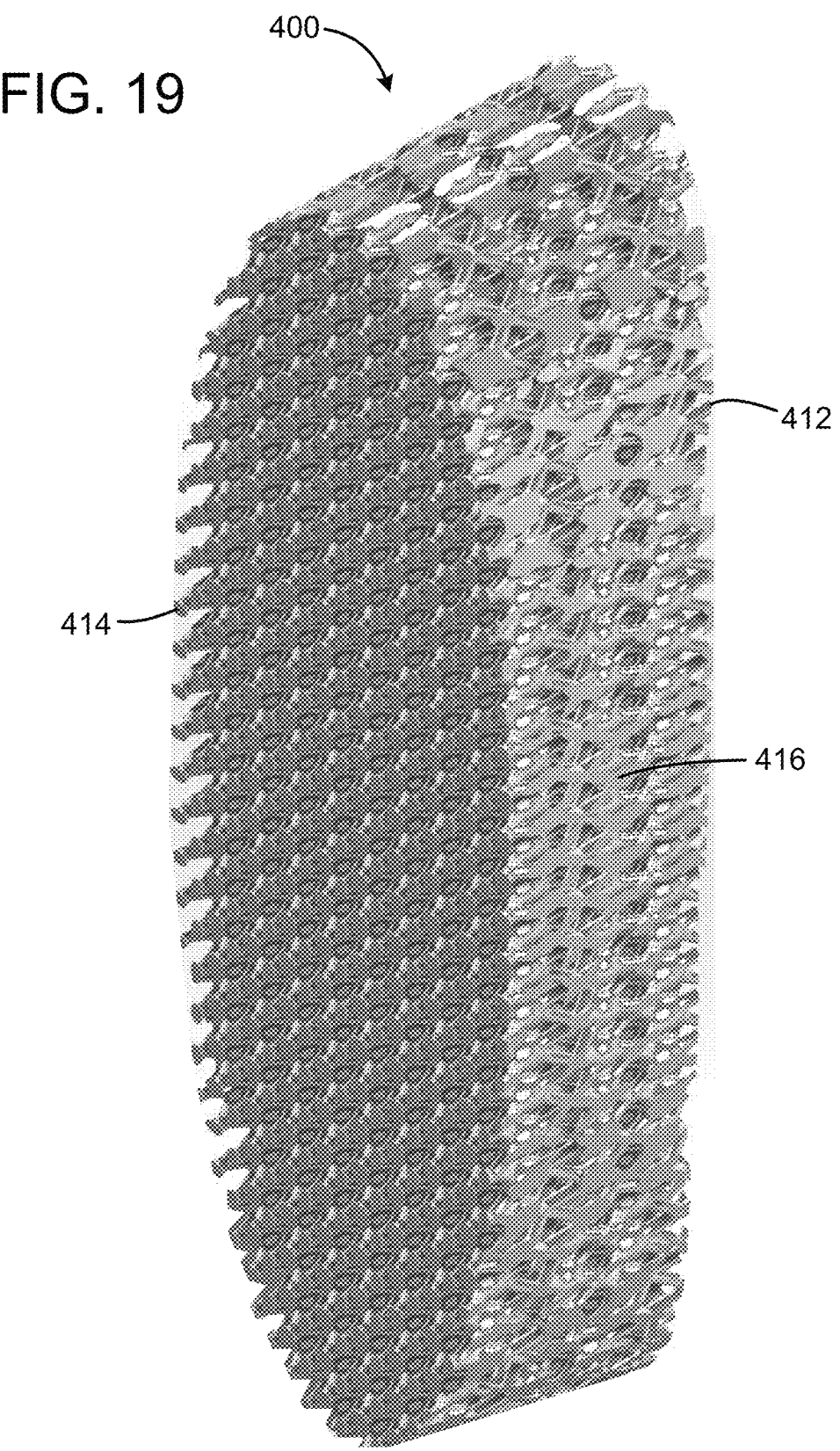
FIG. 19 is a rear isometric view of a third alternative embodiment of the body/core of the recoil pad for a firearm of FIG. 1.
Figure 20:
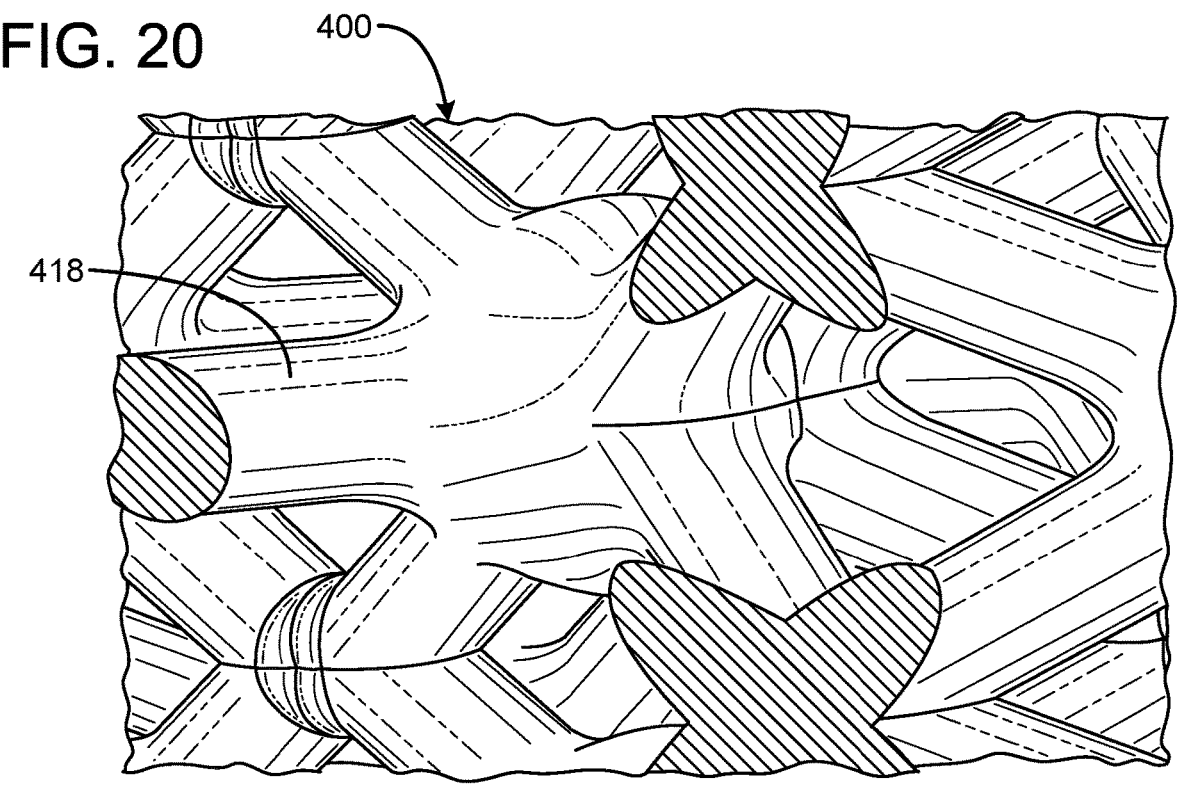
FIG. 20 is an enlarged view of the third alternative embodiment of the body/core of the recoil pad for a firearm of FIG. 19.
Figure 21:
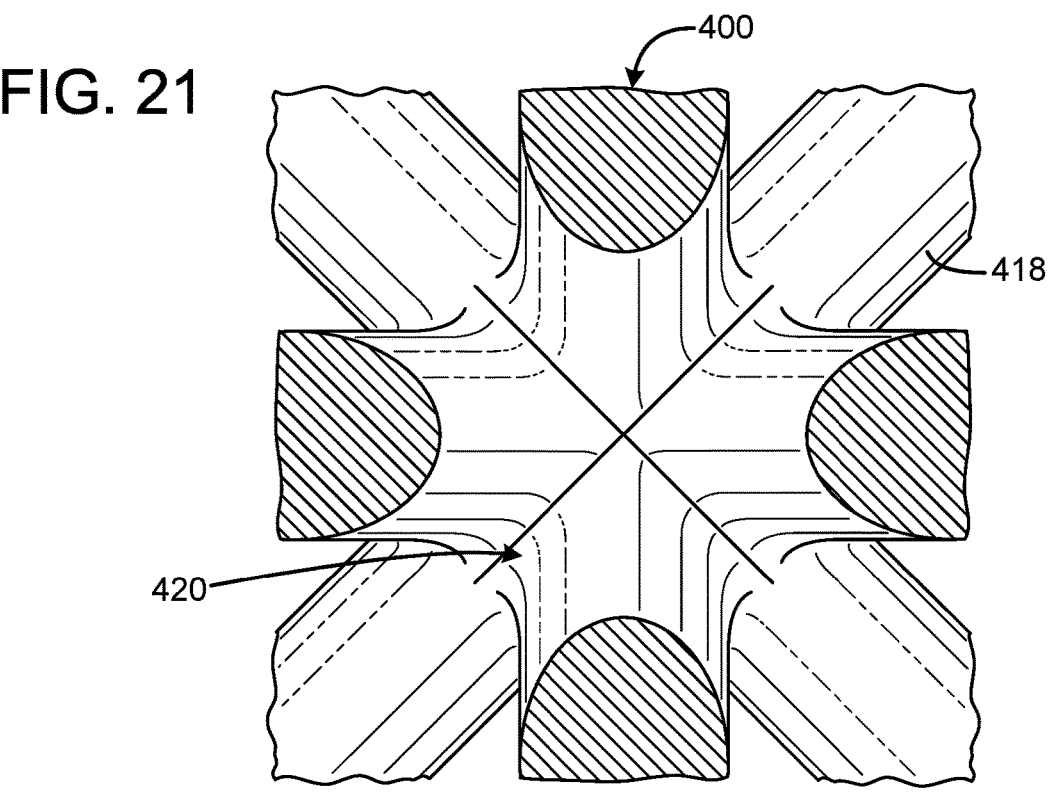
FIG. 21 is an enlarged view of the third alternative embodiment of the body/core of the recoil pad for a firearm of FIG. 19.
Figure 22:
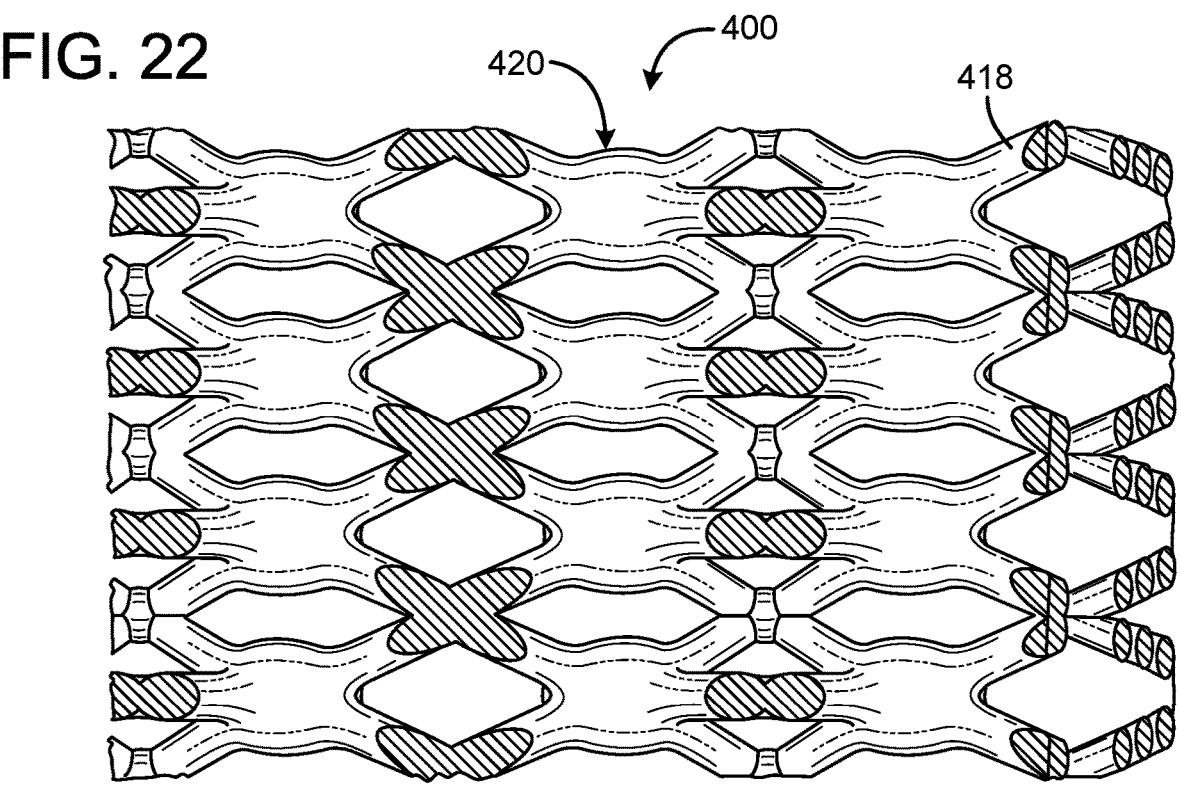
FIG. 22 is an enlarged side view of the third alternative embodiment of the body/core of the recoil pad for a firearm of FIG. 19.

An embodiment of the recoil pad for a firearm of the present invention is shown and generally designated by the reference numeral 10.

FIGS. 1-7 illustrate the improved recoil pad for a firearm 10 of the present invention. More particularly, the recoil pad for a firearm 10 has a compressible body/core 12 having a forward surface 14 configured to face toward a firearm 100, an opposed rear surface 16 configured to face toward the shoulder of a user, and a peripheral surface 18 spanning from the rear surface to the forward surface. A peripheral element 20 encompasses the peripheral surface of the body. A rear panel portion 22 is attached to the rear surface, and a front panel portion 36 is attached to the front surface. The rear panel is connected integrally at the rear surface and is formed of the same material as the body. The front panel is connected integrally at the forward surface and is formed of the same material as the body.

The body 12 includes a plurality of planar members 24 interconnected by elongated spans 26. The body defines a medial plane 28 associated with a medial plane 102 of the firearm 100, and the planar members are oriented perpendicularly to the medial plane of the body. The body defines an array of elongated holes passing laterally through the body. Specifically, the body defines a first array of elongated holes 30 passing through the body in a first direction, and a second array of elongated holes 32 passing through the body in a second direction perpendicular to the first direction. The plurality of planar members is spaced-apart and parallel to the first direction and to the second direction such that the spaced-apart planar members are not penetrated by the holes of the first and second arrays. The rear panel portion 22 encloses at least some of the elongated holes of the first and second arrays. In the current embodiment, at least some of the elongated holes of the first and second arrays are hexagonal. The peripheral element 20 is a mesh formed of a plurality of elongated spans 34.

Although the body 12 of the current invention has been described as composed of a plurality of discrete elements, a preferred embodiment of the body is a unitary mass that is an agglomeration of welded particles formed by additive manufacturing/3D printing. The body comprises an anisotropic matrix of flexible material extending from the forward surface 14 to the rear surface 16. The front panel portion 36 has a front surface 38 that includes an attachment facility 40 suitable for attaching the body to a rear surface 106 of a stock 104 of the firearm 100. In the current embodiment, the attachment facility is a gluable front surface, but can also be screw holes, reinforced screw bosses, or any other suitable feature to facilitate attachment. The front panel portion also defines a top notch 42, bottom notch 44, right notch 46, and left notch 48 for the purpose of aligning the recoil pad to the rifle stock. Notches or tabs can be added to improve alignment of the recoil pad to the stock during the manufacturing process. The peripheral element 20 has a top portion 50 and a bottom portion 52 that form solid surfaces connected to the mesh portions of the peripheral element.

FIGS. 8-13 illustrate a first alternative embodiment of the body 200 of the improved recoil pad for a firearm of the present invention. More particularly, the body 200 has a forward surface 212 configured to face toward a firearm 100, an opposed rear surface 214 configured to face toward the shoulder of a user, a first array of elongated holes 216, a second array of elongated holes 218, and a plurality of planar members 220 interconnected by elongated spans 222. The body also includes a peripheral surface 224 spanning from the rear surface to the forward surface. The body 200 is combined with the peripheral element 20, rear panel 22, and front panel 36 to form a complete recoil pad for a firearm. Although the body has been described as composed of a plurality of discrete elements, a preferred embodiment of the body is a unitary mass that is an agglomeration of welded particles formed by additive manufacturing/3D printing. The body comprises an anisotropic matrix of flexible material extending from the forward surface to the rear surface. In the current embodiment, at least some of the elongated holes of the first and second arrays are octagonal.

FIGS. 14-18 illustrate a second alternative embodiment of the body 300 of the improved recoil pad for a firearm of the present invention. More particularly, the body/core 300 has a forward surface/portion 312 configured to face toward a firearm 100 and an opposed rear surface/portion 314 configured to face toward the shoulder of a user. The body also includes a peripheral surface 324. The body 300 is combined with the peripheral element 20, rear panel 22, and front panel 36 to form a complete recoil pad for a firearm. Although the body has been described as composed of a plurality of discrete elements, a preferred embodiment of the body is a unitary mass that is an agglomeration of welded particles formed by additive manufacturing/3D printing. The body is formed as a matrix of elongated interconnected elements and comprises an anisotropic matrix of flexible material extending from the forward surface to the rear surface. The elongated interconnected elements are articulated bars 326 each having opposed end portions at different angles. In the current embodiment, the opposed end portions are at a 120° angle. The body has a top portion 330 and a bottom portion 332 that form solid surfaces connected to the elongated interconnected elements. In the current embodiment, the elongated interconnected elements are an array of sixteen elongated interconnected elements radiating outward from a central hub 328 joined to adjacent arrays of sixteen elongated interconnected elements arranged in a repeating pattern, and the elongated interconnected elements are interconnected at an angle of 45°. Instead of having a straight column structure with resistance to buckling, the body is an articulated structure that flexes in a known and controlled direction. The body lacks the initial stiffness that would be supplied by a buckling column. The elongated interconnected elements could be curved bars instead of the articulated bars shown.

FIGS. 19-22 illustrate a third alternative embodiment of the body 400 of the improved recoil pad for a firearm of the present invention. More particularly, the body 400 has a forward surface 412 configured to face toward a firearm 100 and an opposed rear surface 414 configured to face toward the shoulder of a user. The body also includes a peripheral surface 416. The body 400 is combined with the peripheral element 20, rear panel 22, and front panel 36 to form a complete recoil pad for a firearm. Although the body has been described as composed of a plurality of discrete elements, a preferred embodiment of the body is a unitary mass that is an agglomeration of welded particles formed by additive manufacturing/3D printing. The body is formed as a matrix of elongated interconnected elements and comprises an anisotropic matrix of flexible material extending from the forward surface to the rear surface. The elongated interconnected elements are straight bars 418 connected at their ends, each being cylindrical and having a constant cross-section. The elongated interconnected elements each have a length to width ratio of greater than 2 and less than 10. In the current embodiment, the elongated interconnected elements are an array of eight elongated interconnected elements radiating outward from a central hub 420 joined to adjacent arrays of eight elongated interconnected elements arranged in a repeating pattern, and the elongated interconnected elements branch from the central hub at an angle of 120°.

Figure 23:
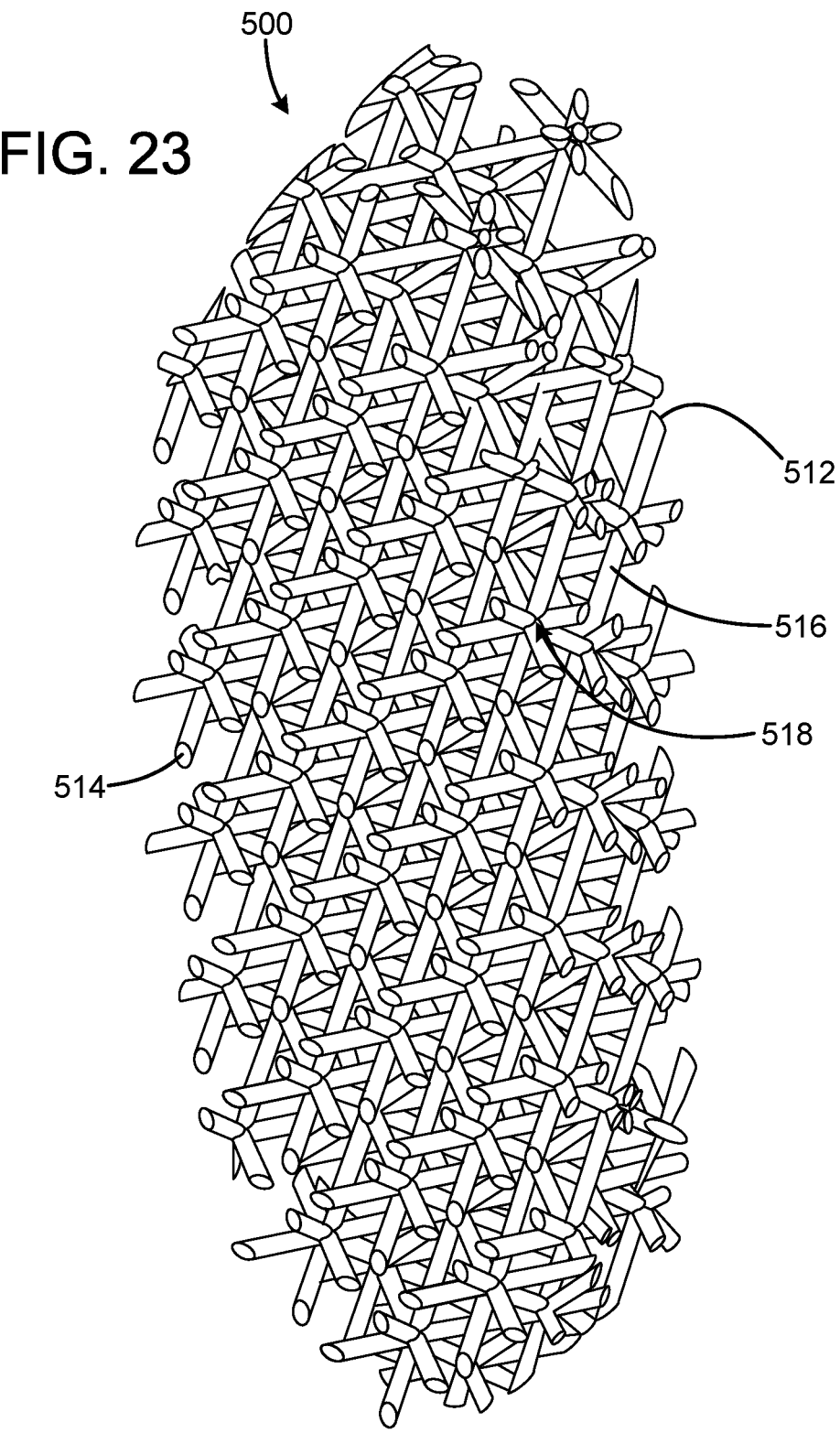
FIG. 23 is a rear isometric view of a fourth alternative embodiment of the body/core of the recoil pad for a firearm of FIG. 1.
Figure 24:
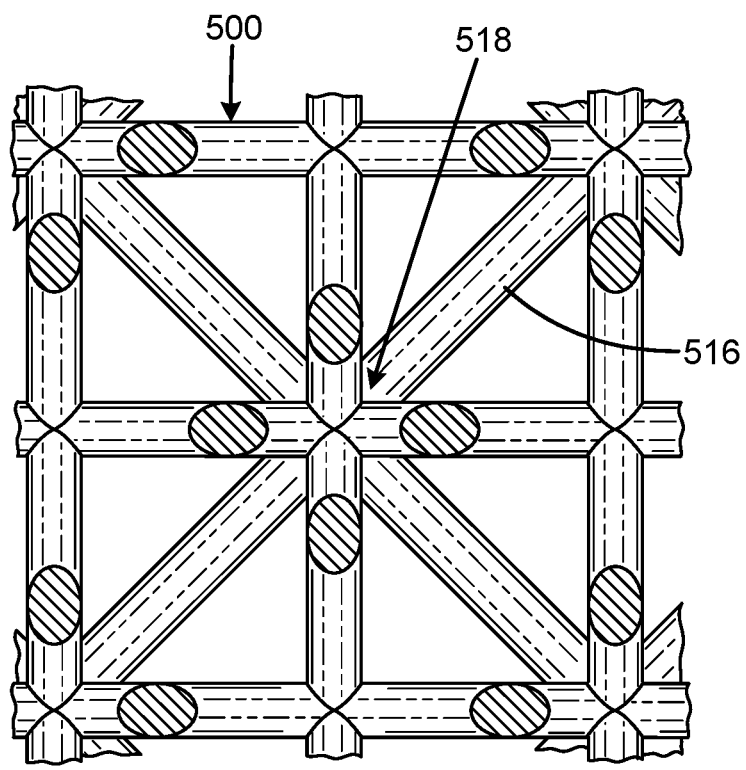
FIG. 24 is an enlarged bottom view of the fourth alternative embodiment of the body/core of the recoil pad for a firearm of FIG. 23.
Figure 25:
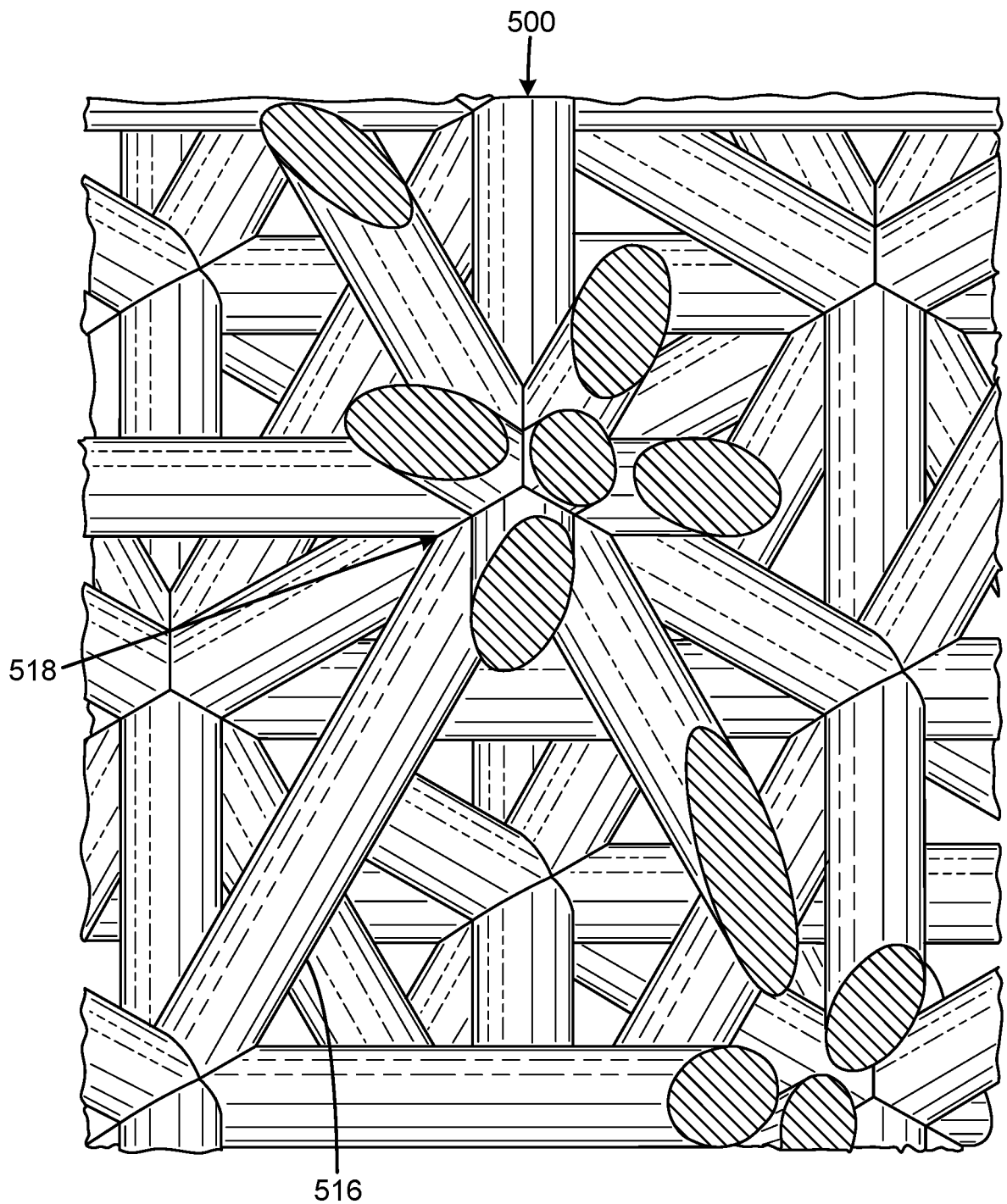
FIG. 25 is an enlarged isometric view of the fourth alternative embodiment of the body/core of the recoil pad for a firearm of FIG. 23.

FIGS. 23-25 illustrate a fourth alternative embodiment of the body 500 of the improved recoil pad for a firearm of the present invention. More particularly, the body 500 has a forward surface 512 configured to face toward a firearm 100 and an opposed rear surface 514 configured to face toward the shoulder of a user. The body 500 is combined with the peripheral element 20, rear panel 22, and front panel 36 to form a complete recoil pad for a firearm. Although the body has been described as composed of a plurality of discrete elements, a preferred embodiment of the body is a unitary mass that is an agglomeration of welded particles formed by additive manufacturing/3D printing. The body is formed as a matrix of elongated interconnected elements and comprises an anisotropic matrix of flexible material extending from the forward surface to the rear surface. The elongated interconnected elements are straight bars 516 connected at their ends, each being cylindrical and having a constant cross-section. The elongated interconnected elements each have a length to width ratio of greater than 2 and less than 10. In the current embodiment, an array of thirty-six elongated interconnected elements radiate outward from a central hub 518, which is a dodecahedron in which three interconnected elements protrude from each of twelve faces of the dodecahedron and are joined to adjacent central hubs of dodecahedrons in a repeating pattern.

It should be appreciated that the current embodiments of the body/core and peripheral element are mesh designs with elastomeric properties and densified regions enabling the recoil forces resulting from discharge of the host firearm to be directed and dissipated via differential collapse of the recoil pad in both longitudinal and lateral directions. This enables recoil forces to be directed in directions not possible with prior art recoil pads. The mesh design with solid surfaces at the top and bottom portion of the peripheral element also provides dimensional control to direct recoil forces in the desired directions to provide the user with better handling and feel during and immediately following firearm discharge.

In the context of the specification, the terms "rear" and "rearward," and "front" and "forward" have the following definitions: "rear" or "rearward" means in the direction away from the muzzle of the firearm while "front" or "forward" means it is in the direction towards the muzzle of the firearm.

While current embodiments of a recoil pad for a firearm has been described in detail, it should be apparent that modifications and variations thereto are possible, all of which fall within the true spirit and scope of the invention. For example, the rear panel portion could be an open mesh design instead of the solid design shown. One advantage of the solid design is prevention of dirt and grime entering the body/core when the firearm is set on the ground. Furthermore, although additive manufacturing/3D printing is the preferred method of manufacturing because of the narrow channels associated with the matrix design of the body/core, alternative methods of manufacturing could be used. In addition, the structure of the body/core and peripheral element can be dimensioned to fit a particular stock and modeled for the shooter and caliber/recoil energy of the host firearm. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A recoil pad for a firearm having an elongated stock defining a vertical medial stock plane comprising:
    a compressible body;
    the body having a forward surface configured to face toward the firearm, an opposed rear surface configured to face toward the shoulder of a user;
    the body defining a vertical medial body plane perpendicular to the forward surface and parallel to the stock plane;
    the body comprising an anisotropic matrix of flexible material extending from the forward surface to the rear surface; and
    the body formed of a multitude of interconnected elements having surface portions facing in a direction at least partly toward the medial body plane.

2. The recoil pad for a firearm of claim 1 wherein the body is a unitary mass.

3. The recoil pad for a firearm of claim 1 wherein the body is an agglomeration of welded particles.

4. The recoil pad for a firearm of claim 1 wherein the body comprises a plurality of planar members interconnected by elongated spans.

5. The recoil pad for a firearm of claim 4 wherein the body defines a medial plane associated with a medial plane of the firearm, and wherein the planar members are oriented perpendicularly to the medial plane of the body.

6. The recoil pad for a firearm of claim 1 wherein the body defines a medial plane associated with a medial plane of the firearm and wherein the body defines an array of elongated holes passing laterally through the body.

7. The recoil pad for a firearm of claim 1 wherein the body defines a first array of elongated holes passing through the body in a first direction, and a second array of elongated holes passing through the body in a second direction perpendicular to the first direction.

8. The recoil pad for a firearm of claim 7 wherein the body includes a plurality of spaced-apart planar members parallel to the first direction and to the second direction such that the spaced-apart planar members are not penetrated by the elongated holes of the first and second arrays.

9. The recoil pad for a firearm of claim 7 including a rear panel portion enclosing at least some of the elongated holes of the first and second arrays.

10. The recoil pad for a firearm of claim 7 wherein at least some of the elongated holes of the first and second arrays are hexagonal.

11. The recoil pad for a firearm of claim 1 wherein the body has a peripheral surface spanning from the rear surface to the forward surface, and encompassed by a peripheral element.

12. The recoil pad for a firearm of claim 11 wherein the peripheral element is a mesh formed of a plurality of elongated spans.

13. A recoil pad for a firearm comprising:
a core defining a vertical medial body plane perpendicular to the forward surface and parallel to the stock plane and formed as a matrix of interconnected elements;
at least some of the interconnected elements having surface portions facing in a direction at least partly toward the medial body plane;
the core having a forward portion configured to face toward the firearm and an opposed rear portion configured to face toward the shoulder of a user, and wherein the core comprises an anisotropic matrix of flexible material extending from the forward surface to the rear surface.

14. The recoil pad for a firearm of claim 13 including a rear panel connected integrally at the rear portion and formed of the same material as the core.

15. The recoil pad for a firearm of claim 13 including a front panel connected integrally at the front portion and formed of the same material as the core.

16. The recoil pad for a firearm of claim 15 wherein the front panel includes an attachment facility configured to connect to a firearm stock.

17. The recoil pad for a firearm of claim 13 wherein the interconnected elements are elongated.

18. The recoil pad for a firearm of claim 17 wherein the elongated interconnected elements are articulated bars each having opposed end portions at different angles.

19. The recoil pad for a firearm of claim 17 wherein the elongated interconnected elements each have a length to width ratio of greater than 2.

20. The recoil pad for a firearm of claim 17 wherein the elongated interconnected elements each have a length to width ratio of less than 10.

21. The recoil pad for a firearm of claim 17 wherein the elongated interconnected elements are straight bars connected at their ends.

22. The recoil pad for a firearm of claim 13 wherein at least some of the surface portions are obstructed by another interconnected element from view in a direction perpendicular to the medial plane.

* * * * *